United States Patent
Raoult et al.

(10) Patent No.: US 6,574,036 B1
(45) Date of Patent: Jun. 3, 2003

(54) PROCEDURE AND DEVICE FOR THE PROGRAMMABLE TIME PROFILE SHAPING OF QUASI-MONOCHROMATIC OPTICAL PULSES

(75) Inventors: Fabrice Raoult, Corbeil (FR); Daniel Husson, Yerres (FR); Claude Rouyer, Cestas (FR); Christian Sauteret, Paris (FR); Arnold Migus, Sceaux (FR)

(73) Assignee: Commissariat a l'Energie Atomique (FR)

( * ) Notice: Subject to any disclaimer, the term of this patent is extended or adjusted under 35 U.S.C. 154(b) by 0 days.

(21) Appl. No.: 10/018,271

(22) PCT Filed: Jun. 14, 2000

(86) PCT No.: PCT/FR00/01649

§ 371 (c)(1),
(2), (4) Date: Dec. 7, 2001

(87) PCT Pub. No.: WO00/77891

PCT Pub. Date: Dec. 21, 2000

(30) Foreign Application Priority Data

Jun. 15, 1999 (FR) .............................................. 99 07541

(51) Int. Cl.$^7$ ................................................ G02F 2/02
(52) U.S. Cl. ........................ 359/326; 359/184; 372/25
(58) Field of Search ................................. 359/325–332, 359/181, 184–187; 372/25

(56) References Cited

PUBLICATIONS

Raoult, F. et al.: "Efficient frequency tripling of 1.06 mu m, 300–fs chirped pulses" Conference on Lasers and Electro–Optics, Europe—Technical Digest, (May 8, 1998), p. 523.

Raoult, F. et al.: "Efficient Generation of Narrow–Bandwidth Picosecond Pulses by Frequency Doubling of Femtosecond chirped Pulses" Optics Letters, US, Optical Society of America, Washington, (Jul. 15, 1998), vol. 23, No. 14, pp. 1117–1119.

"Shaping of Nanosecond Linearly Chirped Pulses" LLE Review (Oct.–Dec. 1992) vol. 53, pp. 38–55.

*Primary Examiner*—John D. Lee
(74) *Attorney, Agent, or Firm*—Hayes Soloway P.C.

(57) ABSTRACT

An optical process for the programmable time profile shaping of quasi-monochromatic optical pulses, involves the following steps: (1) spectral components of a wide spectrum pulse are spread out over time, and a stretched pulse with frequency drift is obtained, while conserving spectral width; (2) the pulse is spectrally shaped and, as a consequence, time shaped; and (3) the wide spectrum is converted into a narrow spectrum, while conserving time shaping.

6 Claims, 5 Drawing Sheets

PROCEDURE AND DEVICE FOR THE PROGRAMMABLE TIME PROFILE SHAPING OF QUASI-MONOCHROMATIC OPTICAL PULSES

DESCRIPTION

1. Technical Field

The present invention concerns a method and a device for the programmable time profile shaping of quasi-monochromatic optical pulses.

2. State of the Prior Art

In certain applications that use pulsed laser sources, it is necessary to shape the time profile of the amplitude of the optical pulses. Examples that may be cited include the field of power lasers, or the telecommunications field, where it is necessary to shape the profile of pulses in the time domain before transmitting information.

Procedures for shaping the time profile of optical pulses aim to satisfy several criteria simultaneously:

To obtain time profile shaping with good resolution, with preferably 100 to 1,000 points over the whole length of the pulse, with each point being able to reach the femtosecond domain.

To be programmable, in other words to allow a change in the shape of the pulse both when desired and rapidly, for example in an automatic manner.

To be compatible with the production of pulses that have spectra that are as narrow as the Fourier limit of the created pulses.

To produce pulses that can be wavelength tuned.

To not cause too much energy loss.

Basically, two general approaches are used to shape the time profile of laser pulses. The first uses essentially optical methods. The second consists in converting the electronic signals into optical signals, with the corresponding procedures using electro-optical or acousto-optical systems.

Optical Procedures

Procedure For Time Shaping by Spectral Modulation

Figure 1:
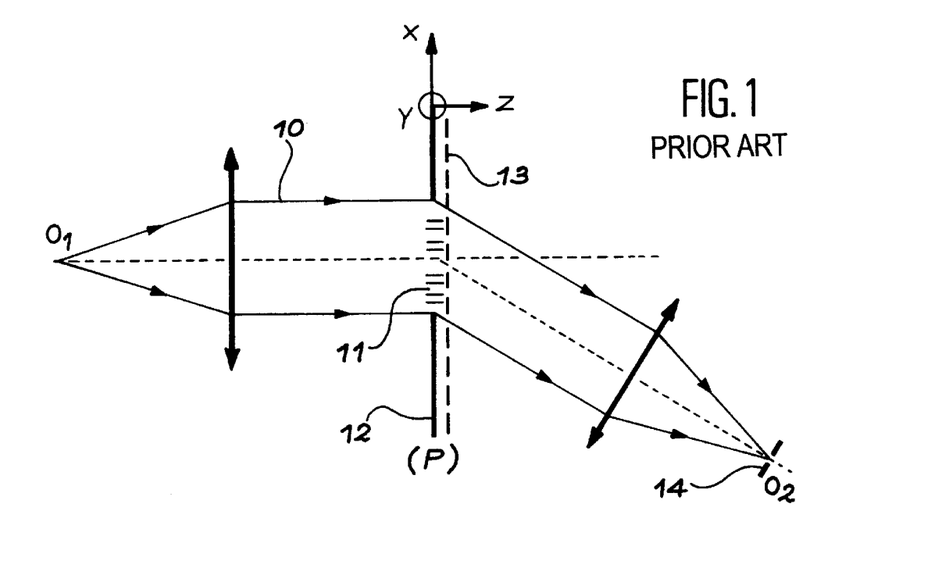
FIG. 1 shows a schematic diagram of time profile shaping by spectral modulation according to the prior art.

An entirely optical modulation procedure of this type is described in the document reference (1) at the end of the description. In this procedure, as shown in FIG. 1, a beam of light 10 from a source point $0_1$, which is collimated, is diffracted by an optical grating 11 so that it can then be focused at point $0_2$. The pupil 12 is located in plane P of the grating 11. When a short pulse is diffracted through the pupil in a given direction, it is possible to construct a time profile h (t) by applying a primitive function of h (t) as a transmitting function using the mask 13, in the plane of the pupil 12 following the direction x. A spatial filter 14 is placed at the point $0_2$ in order to obtain a spectrally homogeneous beam. Such a device is similar to a spectrometer. The time resolution is identical to the length of the injected short pulse. The length of the output pulse is equal to the relative maximum time delay of each of the rays of the beam that covers the pupil 12 in the plane P.

This procedure enables good shaping performance of the time profile to be obtained, particularly as regards the number of desired points. It is programmable: a variable spatial filter only has to be placed in the plane of the pupil. It produces quasi-monochromatic pulses. In addition, it allows a tuneable wavelength to be produced. On the other hand, it has very low energy yield, around the inverse of the number of resolved points.

Procedure For Time Shaping by Fourier Transform

The fields in the frequency range and in the time range are linked by the Fourier transform E(v)=TF[E (t)].

If one wishes the time profile A (t) of the pulse to lie within the Fourier limits, the field must posses a linear phase with the spectral variable. The pulse is then quasi-monochromatic. By acting on the amplitude and the incident pulse phase, it is possible to modify its time profile. The spectral mask M (v) in amplitude and in phase must then satisfy the equation: XXX, where X is the incident spectral field of the device. The procedure therefore consists in simple spectral selection (in amplitude and in phase), providing that the incident spectral field has all of the spectral components of the field to produce (in other words, if (M(v))<1).

Figure 2:
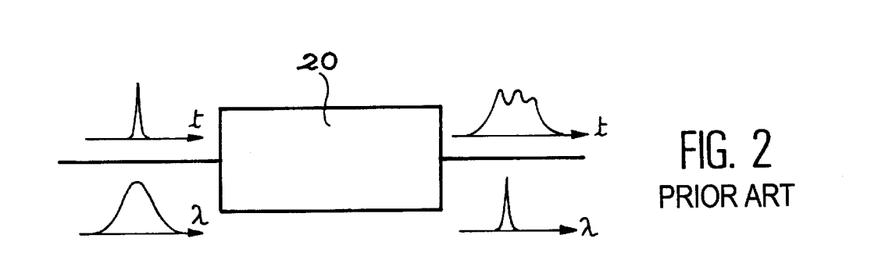
FIG. 2 shows a schematic diagram of the principle of time profile shaping by Fourier transform according to the prior art.

In the device shown in FIG. 2, initially one has a short pulse with a wide spectrum. The spectral amplitude is modified using a spectral selection device 20, made out of spectral amplitude and phase filters. A time profile is then obtained, which is the Fourier transform of the spectral amplitude which has been shaped in the spectral plane.

It can be seen that the spectral selection is achieved in a similar manner for the majority of optical systems. One only has to place a spatial filter in a specific plane of the spectral selection device. It is then possible to achieve programmable shaping by using a variable transmission spatial system.

This Fourier transform time shaping procedure gives goods results as regards the number of resolved points since the desired resolutions may be obtained. It is also programmable, since it uses spectral selection. This procedure also enables a narrow spectrum to be generated, and the wavelength is, in addition, tuneable: one only has to displace the mask in the spectral plane in order to change the wavelength. Although the pulse length is variable, it is dependent on the spectral width of the pulse produced (via the intermediary of the Fourier transform). It is not therefore possible to obtain long pulses. The main disadvantage of this type of procedure is, in fact, the energy yield. As a matter of fact, time shaping with good resolution in the spectral plane requires considerable losses in energy if a narrow spectrum is desired, since a large part of the spectrum must be cut off. This procedure is, as a result, only used very infrequently.

Procedure For Time Shaping Pulses With Frequency Drift

Figure 3:
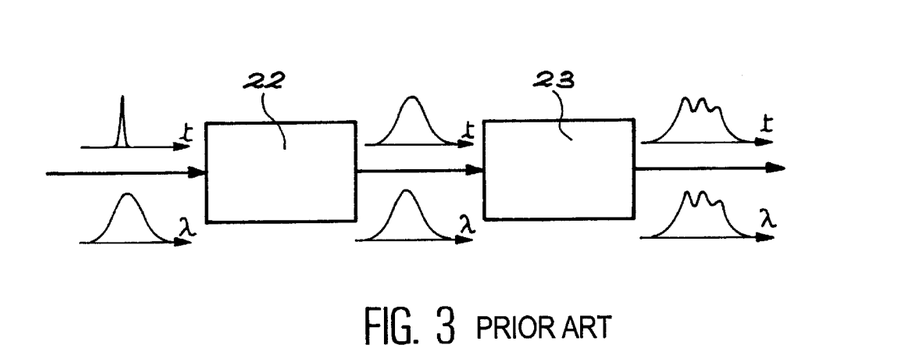
FIG. 3 shows a schematic diagram of the principle of time profile shaping of pulses with frequency drift according to the prior art.

This type of procedure is described in document (2). FIG. 3 shows a schematic diagram of this procedure. The pulses are schematically represented in order to show their length and their spectral width. Time shaping by completely optical means may be achieved by using short pulses. Such pulses, which have wide spectra, are frequency drifted after going through a dispersion device 22, as in that described in document (3). The wavelengths are then time dispersed, which involves spreading out the wavelengths that make up the wide spectrum over time. By selecting the wavelengths using a spectral selection device 23, time shaping is carried out.

Very good resolution may be achieved using this procedure, with the number of resolved points greater than 100. This procedure allows programmable time shaping: it consists, in effect, in transferring the shaping into the spectral range and a large number of programmable spectral selection systems are available, such as that described in document (4). The energy loss caused by this type of procedure is minimal, since only the essential components of the pulse are lost in time shaping. However, the shaped pulse has a wide spectrum.

Figure 4:
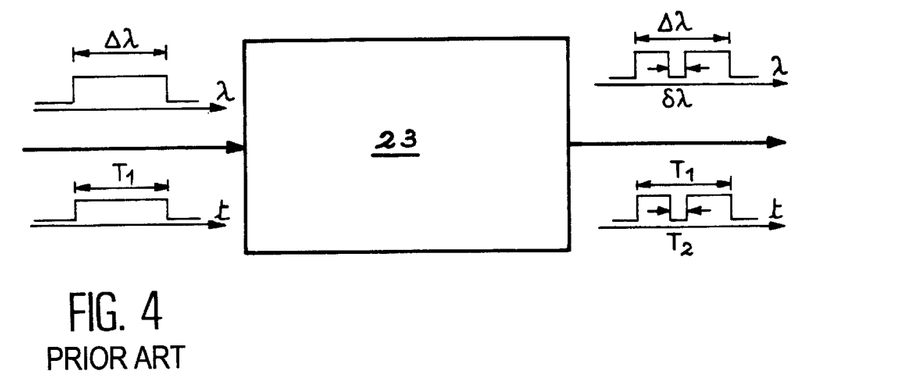
FIG. 4 shows a schematic diagram of the principle of time profile shaping systems using spectral selection according to the prior art.

It can be seen that procedures that use a spectral selection device 23 to carry out the shaping of the time profile of a pulse, whose means of operation is schematically shown in FIG. 4, generally all operate on the basis of a spectrometer. The resolving power is, by definition, the ratio between the central wavelength of the device $\lambda$ and the spectral resolution $\delta\lambda$:$R=\lambda/\delta\lambda$. The number, P, of time resolved points is defined by $T_1/T_2$ and is given by the equation:

$$P = \frac{\Delta\lambda}{\lambda} \frac{\lambda}{\delta\lambda}.$$

The quantity $\Delta\lambda/\lambda$ is a characteristic of the incident laser pulse in the system. The order of magnitude of the $\Delta\lambda/\lambda$ quantities is from $10^{-2}$ to $10^{-1}$ depending on the wavelengths used. The resolving power is conventionally around $10^4$. This type of device therefore allows a number of resolved points of between 100 and 1,000 to be obtained.

Electro-optical Procedures

These procedures achieve time profile shaping by converting the electronic signals into optical signals and obtaining an interference between the non-modified part of an optical impulsion and the modified part of this optical pulse using an electrical signal.

Figure 5:
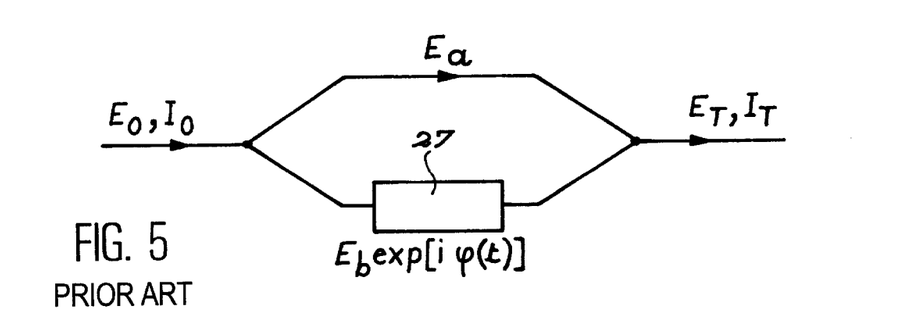
FIG. 5 shows a schematic diagram of the principle of time profile shaping systems using electro-optical procedures according to the prior art.

FIG. 5 shows a schematic diagram of this type of procedure. A field $E_0$ with intensity $I_0$ is separated into two parts. The two fields $E_a$ and $E_b$ follow different paths, and one of the fields is de-phased in a de-phaser 27. Their sums are then combined so that they interfere with each other. The phase shift varies with the time. One thus obtains the equation: $E_T = E_a + E_b e^{i\Phi(t)}$. In illuminance, one then obtains the equation:

$$I_T = \frac{I_0}{2}[1 + \cos\varphi(t)].$$

This phase shift may be achieved with an electro-optical element, for example by using the Pockels effect, as described in document (5). Several means are available to shape the applied electrical signal, but they all have the same limitations. In effect, the range of frequencies that can be accessed by an electrical system is limited to several gigahertz, which is much less than the optical frequencies (around 100 THz). This type of procedure thus always has limited resolution: several tens of points at the most over the whole length of the pulse in the case of, for example, nanosecond pulses. It is, moreover, extremely difficult to obtain the desired electrical signal forms. The programmable methods that are available are based on the combination of several electrical signals. For example, the combination of several Gaussians or Heaviside functions of different intensities are used in order to create the desired signal, but the downside is that there are always residual amplitude modulations in the optical signal. The only alternative that can be used to improve these modulations and the resolution is to increase the number of electro-optical components, which adds to the number of disadvantages in terms of cost, bulk and ease of use. It is also possible to limit the modulations by filtering the electrical signal. However, this filtering reduces the resolution of the procedure. A compromise then has to be found between the desired resolution and the modulations.

These electro-optical procedures are, nevertheless, the most frequently used. They operate with pulses that have narrow spectra and any length, providing they remain above one nanosecond. They are also be programmable, by acting on the electrical signal. In addition, they do not lead to too high energy losses. However, these procedures do not make the wavelength tuneable and have limited resolution.

None of the procedures of the prior art therefore allow all the desired criteria to be met. The optical procedures generally allow very good performance to be obtained in terms of resolution, but they can only be used with pulses with wide spectra and are costly in terms of energy. Electro-optical procedures allow monochromatic pulses to be created, but do not provide the performance of completely optical shaping.

An article of the prior art entitled "Efficient frequency tripling of 1.06 $\mu$m/300 fs chirped pulses" by F. Raoult et al, published in CLEO' 98, page 523, makes it possible to frequency triple wide band width pulses by using a compressed pulse amplification (CPA) configuration. As shown in the embodiment in FIG. 2, two pulses that are compressed differently in a CPA system or coming out of a wide, beam splitting output of a CPA amplifier, are sent on two stages of pairs of different gratings.

An article of the prior art entitled "Efficient generation of narrow band width picosecond pulses by frequency doubling of femtosecond chirped pulses" by F. Raoult et al, published in Optics Letters, volume 23 (1998), pages 1117 to 1119, describes the generation of narrow band width pulses in picoseconds by frequency mixing of two opposite compressed pulses with wide band width in a type I doubling crystal.

The object of the present invention is therefore to resolve the problems associated with the procedures of the prior art, while making it possible to meet all of the various criteria described above.

DESCRIPTION OF THE INVENTION

The present invention concerns an optical process for the programmable time profile shaping of quasi-monochromatic optical pulses, comprising the following steps:

(1) the spectral components of a wide spectrum pulse are spread out over time and a stretched pulse is obtained while at the same time conserving spectral width;

(2) the pulse is spectrally shaped and, as a consequence, time shaped; and (3) the wide spectrum is converted into a narrow spectrum while conserving time shaping.

In one embodiment:

two input pulses are provided;

these two pulses are stretched;

one of the two pulses is shaped; and the frequencies of these two pulses are mixed by combining the sums or the differences of the frequencies of these two pulses.

In a first example of the embodiment:

two pulses, whose frequency drifts have opposite signs, are provided, with these two pulses being such that: $\omega_1(t) = \omega_0 + 2\phi'(t)$ and $\omega_2(t) = \omega_0 - \phi'(t)$;

one of the two pulses is time shaped; and the sums of the frequencies of the two pulses are combined in order to obtain a time shaped, monochromatic pulse, such that: $\omega_3(t) = \omega_2(t) + \omega_1(t) = 2\omega_0$.

In a second example of the embodiment:

two input pulses, whose frequency drifts have the same signs, are provided, with these two pulses being such that: $\omega_1(t) = \omega_0 + 2\phi'(t)$ and $\omega_2(t) = \omega_0 + \phi'(t)$;

one of the two pulses is time shaped;

the second pulse is converted into is second harmonic; and the difference of the frequencies of the two pulses are combined in order to obtain a time shaped, monochromatic pulse, such that: $\omega_3(t)=\omega_2(t)-\omega_1(t)=\omega_0$.

The process according to the invention fully meets all of the desired requirements. In fact, it benefits from excellent shaping performance of the optical time profile. It produces a narrow spectrum pulse and, in addition, benefits from a very advantageous aspect: it offer, in fact, the possibility of obtaining a variable wavelength over several nanometers. Moreover, its energy yield is good, sine it mainly depends on frequency conversion, and the pulse may be adapted (in terms of intensity) to the conversion procedure in such a way as to obtain excellent yield.

The present invention also concerns an optical device for the programmable time shaping of quasi-monochromatic optical pulses, comprising:

a dispersion device; and a spectral selection device;

whereby it comprises, in addition, a device for converting wide spectra into narrow spectra.

In one embodiment, this device comprises:

a first path that comprises a first dispersion device followed by a special selection device;

a second path that comprises a second dispersion device;

a device for mixing the output signals from these two paths;

and, if appropriate, a frequency modulation device placed in one of the two paths.

DETAILED DESCRIPTION OF THE EMBODIMENTS

The principle of the invention consists in adapting a process for time profile shaping of pulses with frequency drift, and comprises:

a frequency dispersion step;

a spectral selection step;

and following these steps by a wide spectrum—narrow spectrum conversion step.

Figure 6:
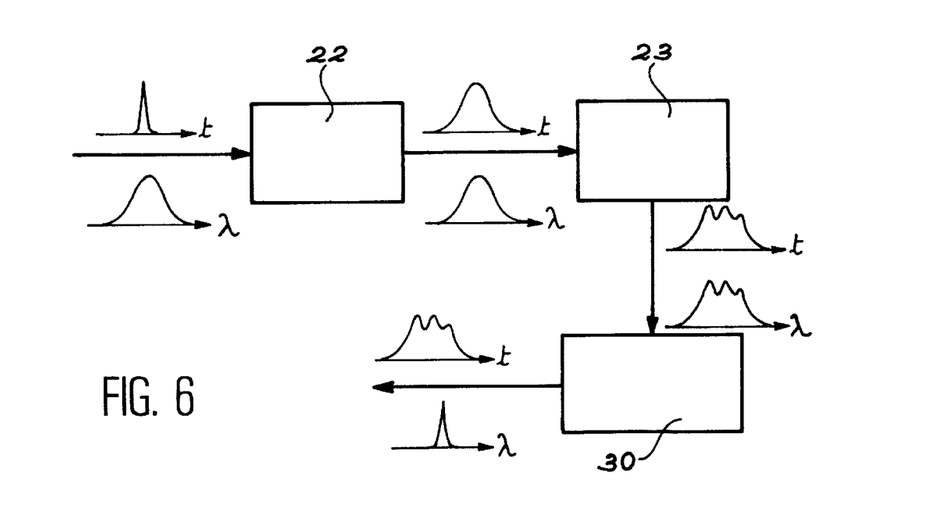
FIG. 6 shows a schematic diagram of the principle of time profile shaping according to the invention.

Thus, as shown in FIG. 6, a dispersion device 22 enables an input pulse that has a wide spectrum and a short length to be spread out over time in order to obtain a stretched pulse, while at the same time conserving spectral width. A spectral selection device 23 then enables the pulse to be spectrally shaped and therefore time shaped. A conversion device 30 then enables a narrow spectrum to be obtained from a wide spectrum, while at the same time conserving time shaping.

The process according to the invention uses the principle of shaping the time profile of a pulse with frequency drift while adapting it by the conversion from a wide spectrum into a narrow spectrum. Despite this, it benefits from excellent performance as regards the time shaping of the pulses with frequency drift. In this manner, the same number of resolved points (from 100 to 1,000 according to the set up) is obtained.

The wide spectrum to narrow spectrum conversion step makes it possible to obtain pulses that have narrow spectra, which are only limited b the Fourier transforms of the leading edges that one wishes to create. The conversion makes it possible to obtain a pulse that may be adjusted over a range that depends on the spectral width of the input pulses.

In order to use the conversion device that allows pulses with narrow spectra to be obtained from pulses with wide spectra, it is necessary to modify the device for time shaping the pulse with frequency drift. In order to do this, two pulses with wide spectra are created.

Figure 7:
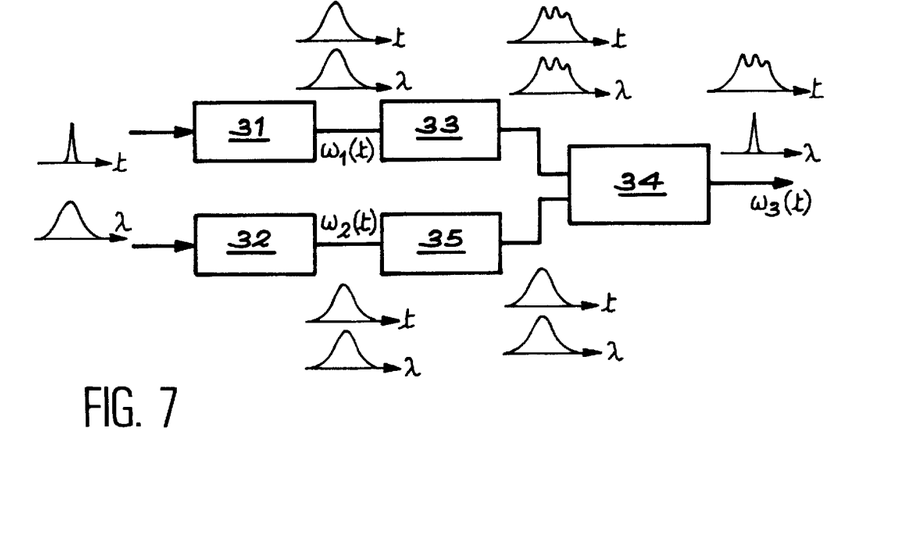
FIG. 7 shows the procedure for time profile shaping according to the invention.

As shown to FIG. 7, one therefore considers two short pulses that have been stretched using the dispersion devices 31 and 32, which each add a spectral phase to the pulses. One can then obtain an expression of the phase introduced by the dispersion systems as a function of time $\phi_i(t)$. One can then introduce the expression of the instantaneous frequency of these two pulses: $\omega_1(t)=\omega_{10}(t)-\phi_1'(t)$ and $\omega_2(t)=\omega_{20}(t)-\phi_2'(t)$. By noting $\omega_1'$, (t) the derivation of the phase over time. The two pulses have wide spectra. One of the two pulses is shaped using a spectral selection device 33. In order to obtain a monochromatic pulse, the sums or the differences of the frequencies of the two pulses are combined in a frequency mixing device 34, as described previously. One then obtains $\omega_3(t)=\omega_1(t)\pm\omega_2(t)=\omega_{10}(t)+\phi_1'(t)\pm(\omega_{20}+\phi_2'(t))$.

The frequency of the wave produced by the frequency conversion device is such that: $\omega_3(t)=(\omega_{10}(t)\pm\omega_{20})+\phi_1'(t)\pm\phi_2'(t)$.

In the process according to the invention, the frequency drifts of the two pulses are adapted in order to be able to reconstitute a narrow spectrum. One chooses the frequency drift, which means that one adapts the terms of the introduced phase by the dispersion systems, so that the sum $\phi_1'(t)\pm\phi_2'(t)$ is equal to zero. One then obtains a monochromatic pulse with frequency $\omega_3(t)=(\omega_{10}\pm\omega_{20})$. By using this process, the time shaping carried out on the pulse is maintained.

A frequency modulation device 35, which is used to modify the frequency of the pulse, may also be added in order to obtain the desired pulsation $\omega_3$ at the output. This device 35 is not indispensable in all cases. It may, moreover, be located in different positions: for example in front of the first 31 or the second 32 dispersion devices, behind the first dispersion device 32, and in front of or behind the spectral dispersion device 33.

An embodiment of the invention process will now be considered.

EXAMPLE OF AN EMBODIMENT

Dispersion Gratings 31 and 32

In order to manipulate the pulse frequencies, dispersion grating devices, as described in document (6), are used.

Figure 8:
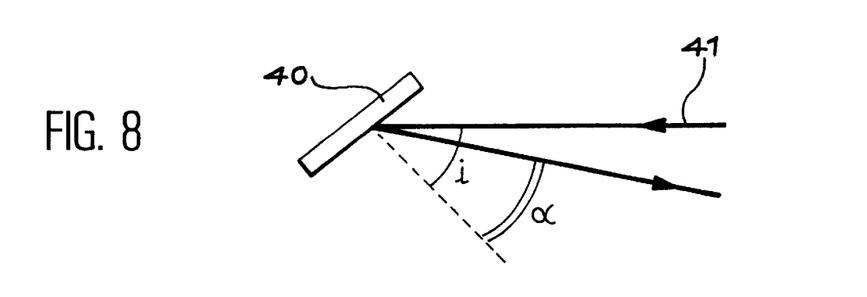
FIGS. 8 to 14 show different examples of embodiments of the present invention.

Traditional dispersion devices that have been developed to compress and stretch short pulses may thus use reflection gratings. A grating of this type 40, as shown in FIG. 8, is an optical component that disperses at an angle the different wavelengths of an incident beam 41.

The dispersion law for gratings that operate by reflection for a beam whose direction of propagation is perpendicular to the direction defined by the grating lines is as follows: sin (i)+sin ($\alpha(\lambda)$)=p N$\lambda$. In this expression, i is the incidence angle in the grating, $\alpha$ is the diffraction angle, and p is a whole number which gives the diffraction order. The gratings are normally made to work to the first order of diffraction. The density of the lines per unit of length of the grating is N. The wavelength is $\lambda$.

Figure 9:
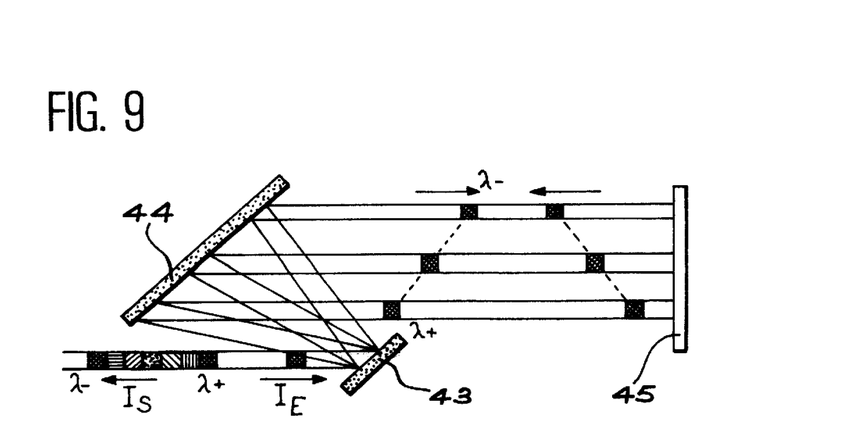

A dispersion device of this type, comprising two gratings 43 and 44, is shown in FIG. 9. The first grating 43 disperses the short input pulse frequencies $I_E$. The second grating 44, parallel to the first, cancels out this dispersion. A double light path within the assembly, thanks to the mirror 45, enables a homogeneous stretched pulse $I_S$ to be obtained.

The monochromatic spectral components of a pulse with a wide spectrum enter at the same time into the device. Each component follows a different path to the others. It then acquires a time shift and all of the components are thus found spread out over time at the output of the system.

Spectral Selection Devices With Gratings 33 (Zero Dispersion Line)

Figure 10:
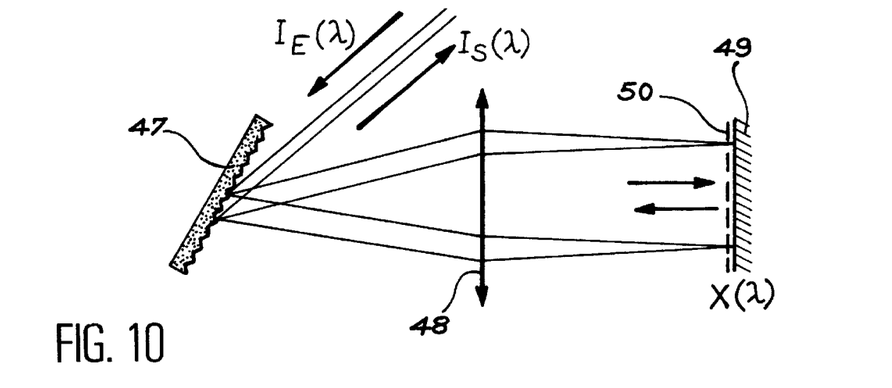

In order to act on the pulse spectrum, a spectral selection device comprising a grating 47, a lens 48, a mirror 49 and a mask 50 is used, as shown in FIG. 10. This device allows the spectral information contained in the pulse to be transferred in the time domain. In fact, this device operates in the following manner: the grating 47 is a dispersion device. It establishes the angular coding of the wavelengths. The lens 48, whose object focal plane is mixed up with the grating 47, transfers the angular coding into spatial coding in the focal plane of the image. By associating the two elements, one obtains, at the focal plane of the lens (spectral plane) a spatial spread out of the image intensity of the spectral intensity. This device is equivalent to a spectrometer.

Within the spectral plane it is possible to select the frequencies by using the mask 50 for spatial shaping of the amplitude, characterised by a transmission T (x) as a function of the spatial variable. $I_{output}(\lambda)=I_{input}(\lambda) \cdot Y[X(\lambda)]$.

In order to recover the time shaped pulse, one only has to make the pulse return along the same path in the opposite direction. One may, for example, place the mirror 49 on the spectral plane level.

Figure 11:
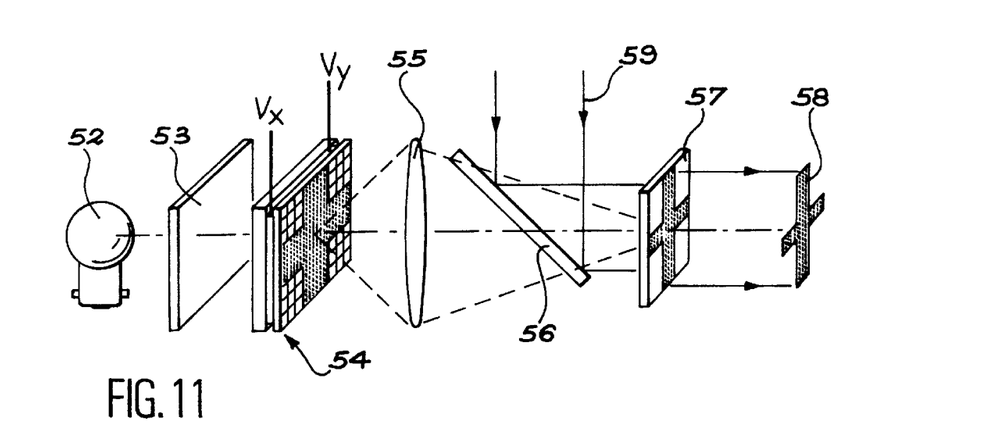

In order to achieve spatial selection in the spectral plane in a programmable manner, one can use a variable spatial shaping device, as described in document (7). This device works in the following manner: a computer generated image is sent to a liquid crystal matrix screen. This is projected onto a photo-conductive valve whose optical transmission varies as a function of the illumination received. The laser beam crossing the valve acquires a spread out of intensity that is proportional to the image initially created. FIG. 11 shows a diagram of the operating principle of the system. In this figure are shown an incoherent source 52, a filter 53, a matrix LCD screen with electronic addressing 54, a lens 55, a dichroic mirror 56, an optical addressing monitor 57, the profile of the resulting beam 58 and the laser to be modulated 59.

The photoconductive valve is thus made out of a layer of liquid crystals that are oriented parallel to each other. Under the effect of an illumination, the crystals change direction, thus creating a local birefringence. A linearly polarised incident wave thus undergoes local polarisation modification. After re-polarisation of the wave created in this manner, amplitude modulations may be observed.

Frequency Modulating Device 35

Figure 12:
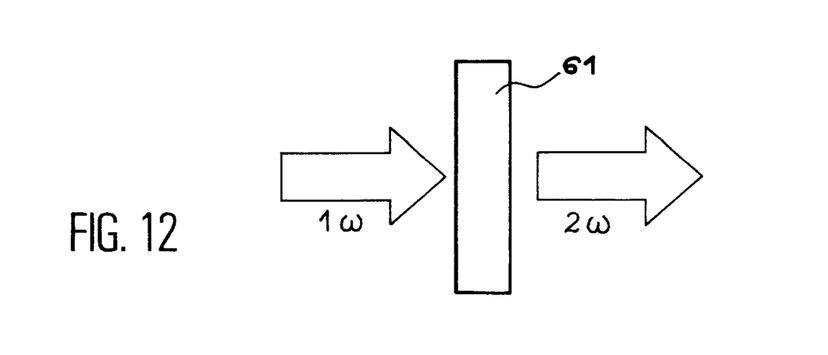

In order to achieve frequency modulation, it is possible to convert the frequency of the pulse into its harmonic by using, for example, a KDP 61 crystal. From an initial pulse with frequency 1$\omega$, one can thus obtain, according to needs, a pulse of 2$\omega$. The principle of this type of working is schematically shown in FIG. 12.

Frequency Mixing Device 34

Two examples of embodiments of such a device for mixing frequencies will now be considered.

1—Example of the Amplitude Time Shaping of a Pulse With Half of the Wavelength of the Incident Wavelength.

In this example, the sums of the frequencies are combined in the frequency mixing device 34. The frequency shifts of the two signals entering this device have opposite signs. The two pulses are chosen so that $\omega_2(t)=\omega_0+\phi'(t)$ and $\omega_2(t)=\omega_0-\phi'(t)$. The first pulse is then time shaped using a spectral selection device 31. In this case, a frequency modulation device is not used. The sums of the frequencies of the two pulses are combined in the frequency mixing device 34 in order to obtain the desired monochromatic, time shaped pulse. The following operation is carried out: $\omega_3(t)=\omega_2(t)+\omega_1(t)=2\omega_0+\phi'(t)-\phi'(t)=2\omega_0$.

Naturally one then obtains a wave that is monochromatic at the harmonic frequency, which has the same time forming characteristics as the input signals.

Thus, one may use an initial pulse at 1053 nm. This is separated into two parts. The frequency drifts of the two pulses thus created are then shaped. Then a KDP type 1 crystal ($\theta=41°187$) is used in double configuration around one micrometer.

Figure 13:
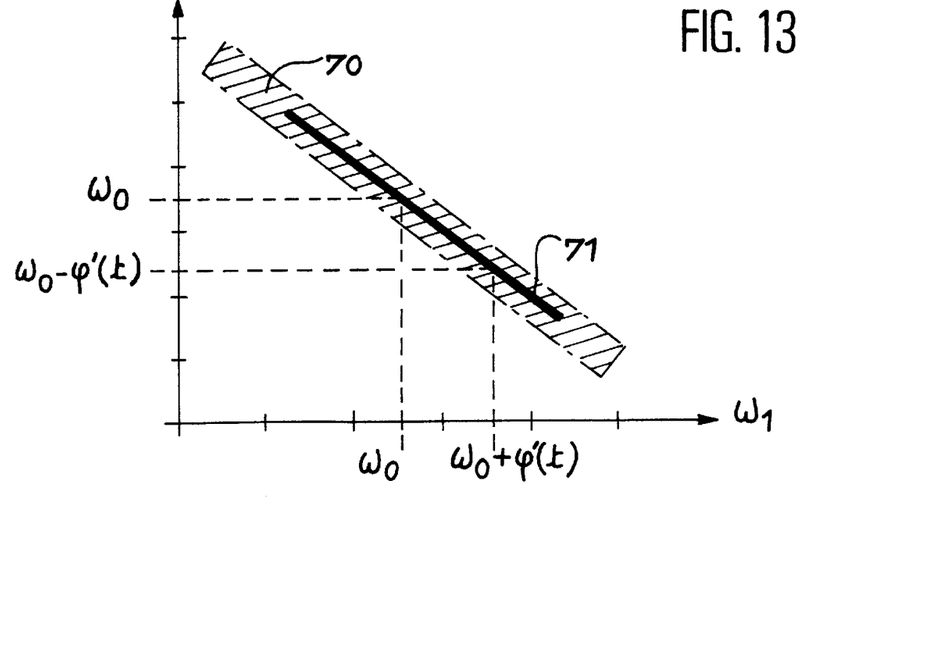

As shown in FIG. 13, in the frequency space ($\omega_1$, $\omega_2$), the phase tuning zone 70, such that $\Delta K \cdot L \ll 2\pi$ (L=thickness of the crystal), with $\Delta K=K_3-K_2-K_1$ for a sum of frequencies and $\Delta K=K_3+K_2-K_1$ for a difference of frequencies, where $K_i$ is the wave vector of wave i, is more or less linear and has a slope of $-1$. This slope is exactly what is required to create a monochromatic wave. As a consequence, one then only has to place the wavelengths by adapting their frequency drift according to this direction (line 71) in order to obtain a monochromatic pulse at 2 $\omega$ (0.5 nm).

2. Example of Amplitude Time Profile Shaping of a Pulse With an Identical Wavelength to that of the Wavelength of the Incident Pulse.

The differences of the frequencies are combined in the frequency mixing device 34. In this case, a frequency drift of the same sign is introduced in the two pulses. The frequency shift is adapted in order to be able to then re-create a narrow spectrum pulse. One therefore chooses: $\omega_1(t)=\omega_0+2\phi'(t)$ and $\omega_2(t)=\omega_0+\phi'(t)$. The first pulse is then time shaped using a spectral selection device 33, while the second is frequency converted into its second harmonic in the frequency modulation device. Its instantaneous frequency is such that: $\omega_2(t)=2\omega_0+2\phi'(t)$. Finally, in the frequency mixing device 34, the differences of the two frequencies are combined in order to obtain the desired monochromatic, time shaped pulse. The following operation is therefore carried out: $\omega_3(t)=\omega_2(t)-\omega_1(t)=2\omega_0+2\phi'(t)-\omega_0-2\phi'(t)=\omega_0$ Naturally, a monochromatic wave is obtained, which has the same time forming characteristics as the waves that have been used to create it.

Thus, one may use an initial pulse at 1053 nm. This is separated into two parts. The frequency drifts of the two pulses thus created are then shaped and one of the two pulses is converted into its second harmonic. Finally, one uses a KDP type II crystal ($\theta=59°228$) in double configuration around one micrometer. Phase tuning is not achieved for all of the wavelengths, but one uses the fact that one is close to the non-critical wavelength and therefore that the KDP has wide spectral acceptance for the wavelength range.

Figure 14:
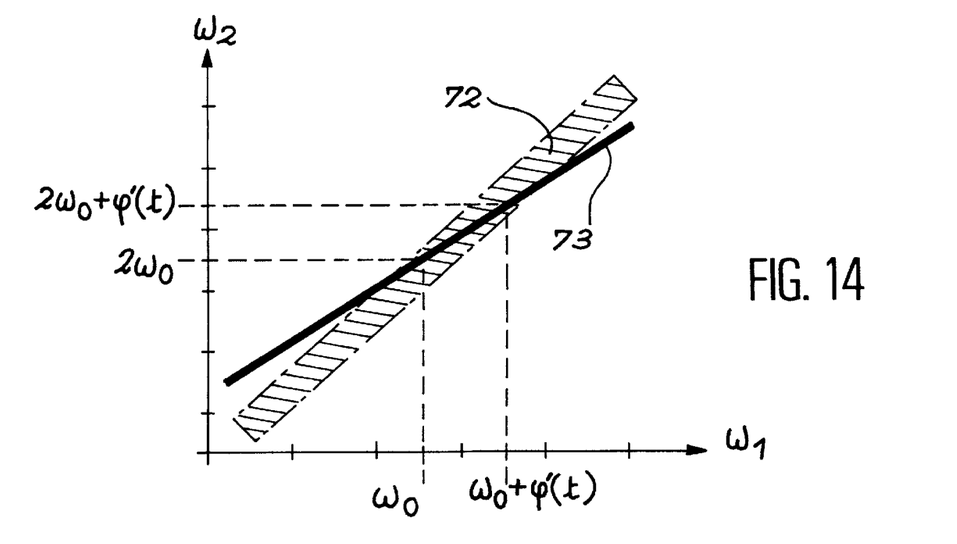

As shown in FIG. 14, in the frequency space ($\omega_1$, $\omega_2$), the phase tuning zone 70, such that $\Delta K \cdot L << 2\pi$, is more or less linear and has a slope of 1.7. To create a monochromatic pulse, a slope of 1 is required. However, the wide acceptance of the crystal is used. By placing the wavelength pairs on the line 73 of slope 1, one is still in the domain where the frequency conversion yield is not affected by the phase discordance.

REFERENCES (1) "Shaping of Short Laser Pulses by Passive Optical Fourier Techniques" by B. Colombeau, M. Vampouille and C. Froehly (Optics Communications, volume 19, number 2, pages 201–204, November 1976).

(2) "Shaping of Nanosecond Linearly Chirped Pulses" (LLE Review, Quarterly Report, October–December 1992, LLE Review, volume 53, paragraph 1. F).

(3) "Negative Group—Velocity Dispersion Using Refraction" by O. E. Martinez, J. P. Gordon and R. L. Fork (Journal of Optical Society of America, volume 1, number 10, October 1984, pages 1003 to 1006).

(4) "Liquid Crystal Light Valve Using Bulk Monocrystalline $Bi_{12}SiO_{20}$ As The Photoconductive Material" by P. Aubourg, J. P. Huignard, M. Hareng and R. A. Mullen (Applied Optics, volume 21, number 20, $15^{th}$ October 1982).

(5) "Amplitude Modulation of Kilowatt Laser Pulses with LNO Pockels Cells Experiments and Results on Phebus Facility" by E. Bar, R. Bailly-Salins, F. Boubal and N. Boyer (Solid State Lasers for Application (SSLA) to Inertial Confinement Fusion (ICF), Third International Conference, 7–12 June 1998, Monterey, Calif., Book of Abstracts).

(6) "Optical Pulse Compression with Diffraction Gratings" by Edmond B. Treacy (IEEE Journal of Quantum Electronics, volume QE—5, number 9, September 1969).

(7) "Amplitude and Phase Coding Measurements of a Liquid Crystal Television" by V. Laude, S. Maze, P. Chavel and Ph. Réfrégier (Optics Communications, volume 103, number 1–2, pages 33 to 38, $1^{st}$ November 1993).

What is claimed is:

1. An optical process for the programmable time profile shaping of quasi-monochromatic optical pulses, comprising the following steps:

(1) providing two wide spectrum input pulses;

(2) spreading spectral components of each of said wide spectrum input pulses out over time, whereby to obtain two stretched pulses, while conserving the pulses' respective spectral widths;

(3) spectrally and time shaping one of the two pulses; and (4) mixing frequencies of the two pulses by combining differences of frequencies of the two pulses so as to convert said wide spectrum input pulses into narrow spectrums, while conserving time shaping.

2. The process according to claim 1, including the step of modulating the frequency of one of the two pulses before the mixing step (4).

3. The process according to claim 1, which comprises:

providing two wide spectrum input pulses, whose frequency drifts have the same sign as a function of time, such that: $\omega_1(t)=\omega_0+2\phi'(t)$ and $\omega_2(t)=\omega_0+\phi'(t)$, wherein $\omega_n$ (n=0 to 3) is frequency and (t) is time;

time shaping one of the two pulses;

converting the other of the two pulses into its second harmonic; and combining the differences of the frequencies of said two pulses so that a time shaped, monochromatic pulse is obtained, such that $\omega_3(t)=\omega_2(t)-\omega_1(t)=\omega_0$.

4. An optical, programmable time shaping device for quasi-monochromatic optical pulses, comprising:

a first path that comprises a first dispersion device followed by a spectral selection device;

a second path that comprises a second dispersion device; and a frequency mixing device for mixing output signals from said first and second paths, wherein differences of frequencies are combined, whereby to convert a wide spectrum into a narrow spectrum.

5. The device according to claim 4, and further comprising a frequency modulation device placed in one of the two paths.

6. The device according to claim 4, wherein the frequency mixing device comprises a birefringent crystal.

* * * * *